United States Patent Office
3,553,256
Patented Jan. 5, 1971

3,553,256
HALOGEN CONTAINING MALEATES AND FUMARATES
Israel J. Dissen, Chicago, Ill., assignor to Velsicol Chemical Corporation, Chicago, Ill., a corporation of Delaware
No Drawing. Filed Apr. 25, 1968, Ser. No. 724,259
Int. Cl. C07c 69/60
U.S. Cl. 260—485                                      6 Claims

ABSTRACT OF THE DISCLOSURE

New chemical compositions of matter having the formula:

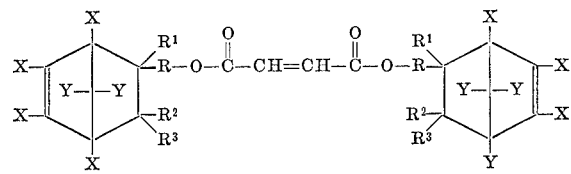

wherein X is selected from the group consisting of chlorine, bromine and fluorine; Y is selected from the group consisting of hydrogen, chlorine, bromine, fluorine and alkoxy; R is an alkylene group containing from one to six carbon atoms; $R^1$, $R^2$ and $R^3$ are selected from the group consisting of hydrogen and alkyl.

---

This invention relates to new compositions of matter. More particularly, the present invention relates to new halogenated bicyclic esters of unsaturated dicarboxylic acids.

The compounds of the present invention have the structure:

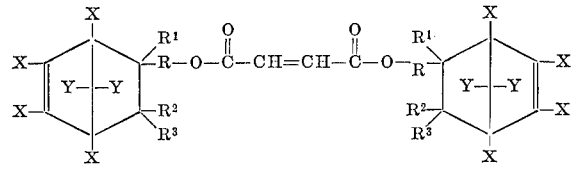

wherein X is selected from the group consisting of chlorine, bromine and fluorine; Y is selected from the group consisting of hydrogen, chlorine, bromine, fluorine and alkoxy; R is an alkylene group containing from one to six carbon atoms; $R^1$, $R^2$ and $R^3$ are independently selected from the group consisting of hydrogen and alkyl.

In a preferred embodiment of this invention $R^1$, $R^2$ and $R^3$ are selected from the group consisting of hydrogen and alkyl containing from one to four carbon atoms.

The compounds of the present invention are useful as plasticizers, and when used as such impart flame and fire retardance to the plasticized composition. The compounds are also useful for preparing a variety of polymeric materials.

Exemplary of the compounds of the present invention are:

bis[(1,4,5,6,7,7-hexachloro-5-norbornen-2-yl)-methyl] maleate,
bis[(1,4,5,6,7,7-hexachloro-5-norbornen-2-yl)-methyl] fumarate,
bis[(1,4,5,6-tetrachloro-5-norbornen-2-yl)-methyl] fumarate,
bis[α-(1,4,5,6,7,7-hexachloro-5-norbornen-2-yl)-ethyl] maleate,
bis[(1,4,5,6,7,7-hexabromo-5-norbornen-2-yl)-methyl] fumarate,
bis[(1,4,5,6,7,7-hexafluoro-5-norbornen-2-yl)-methyl] fumarate,
bis[γ-(1,4,5,6,7,7-hexachloro-5-norbornen-2-yl)-n-propyl]maleate,
bis[β-(1,4,5,6,7,7-hexachloro-3-methyl-5-norbornen-2-yl)-ethyl]fumarate,
bis[δ-(1,4,5,6,7,7-hexachloro-5-norbornen-2-yl)-n-butyl] fumarate,
bis[(1,4,5,6,7,7-hexachloro-3-ethyl-5-norbornen-2-yl)-methyl]maleate,
bis[β-(1,4,5,6,7-pentachloro-3-methyl-5-norbornen-2-yl)-ethyl]fumarate,
bis[ε-(1,4,5,6,7,7-hexachloro-5-norbornen-2-yl)-n-pentyl]fumarate,
bis[(1,4,5,6-tetrachloro-7,7-dimethoxy-5-norbornen-2-yl)-methyl]fuamarate
and the like.

The compounds of the present invention can be readily prepared by reacting two moles of a hydroxyalkylnorbornene of the formula

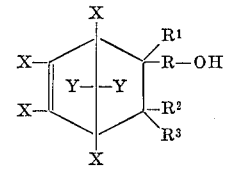

wherein X, Y, R, $R^1$, $R^2$ and $R^3$ are as hereinabove described, with one mole of fumaric acid, maleic acid or maleic anhydride. This reaction can be effected by charging the reactants, dissolved in an inert organic solvent, into a suitable reaction vessel equipped with heating and stirring means, and heating the reaction mixture for a period of from several to about 24 hours. This reaction is preferably carried out in the presence of a catalyst such as paratoluenesulfonic acid at the reflux temperature of the solvent used. After the reaction is completed the reaction mixture stripped of solvent to yield the desired product. This product can be used as such or can be purified by washing, treatment with Fuller's earth, distillation, treatment with activated charcoal or other such methods well known to the art.

Exemplary of the hydroxyalkylnorbornene compounds of Formula I suitable for preparing the compounds of the present invention are:

1,4,5,6,7,7-hexachloro-2-hydroxymethyl-5-norbornene,
1,4,5,6,7,7-hexabromo-2-(β-hydroxyethyl)-5-norbornene,
1,4,5,6,7,7-hexafluoro-2-hydroxymethyl-5-norbornene,
1,4,5,6,7,7-hexachloro-2-hydroxymethyl-3-methyl-5-norbornene,
1,4,5,6,7,7-hexachloro-2-hydroxymethyl-3,3-dimethyl-5-norbornene,
1,4,5,6-tetrachloro-2-methyl-2-hydroxymethyl-5-norbornene,
1,4,5,6,7-pentachloro-2-hydroxymethyl-5-norbornene,
1,4,5,6-tetrabromo-2-methyl-2-hydroxymethyl-5-norbornene,
1,4,5,6,7,7-hexafluoro-2-hydroxymethyl-3-n-propyl-5-norbornene,
1,4,5,6,7,7-hexachloro-2-(γ-hydroxypropyl)-5-norbornene,
1,4,5,6-tetrachloro-7,7-dimethoxy-2-hydroxymethyl-5-norbornene,
1,4,5,6-tetrabromo-7,7-diethoxy-2-(β-hydroxyethyl)-5-norbornene and the like.
The above hydroxyalkylnorbornene compounds, if not readily available, can be prepared via the well known Diels-Alder Diene Synthesis by the adduction of a polyhalocyclopentadiene with an unsaturated alcohol.

Suitable polyhalocyclopentadienes are: hexachlorocyclopentadiene, hexabromocyclopentadiene, hexafluorocyclopentadiene, pentachlorocyclopentadiene, pentabromocyclopentadiene, pentafluorocyclopentadiene, tetrachlorocyclopentadiene, 5,5 - difluorotetrachlorocyclopentadiene, 1,2,3,4-tetrachloro-5,5-dimethoxycyclopentadiene, 1,2,3,4-tetrabromo-5,5-diethoxycyclopentadiene and the like. Exemplary of the suitable unsaturated alcohols which can adduct with the polyhalocyclopentadienes are: allyl alcohol, 2-buten-1-ol, 3-buten-1-ol, 3-buten-2-ol, 3-methyl-2-buten-2-ol, 1-penten-3-ol, 2-penten-1-ol, 3-penten-2-ol, 4-penten-1-ol, 4-phenten-2-ol, 2 - methyl-2-penten-1-ol, 3-methyl-2-penten-1-ol, 4-methyl-2-penten-1-ol, 4-methyl-3-penten-1-ol, 2-methyl-3-penten-2-ol, 3-methyl-3-penten-2-ol, 4-methyl-3-penten-2-ol, 2-methyl - 4 - penten-2-ol, 3-methyl-4-penten-2-ol, 4-methyl-4-penten-2-ol, 3-methyl-1-penten-3-ol, 2-hexen-1-ol, 3-hexen-1-ol, 4-hexen-1-ol, 5-hexen-1-ol, 4-hexen-2-ol, 5-hexen-2-ol, 1-hexen-3-ol, 5-hexen-3-ol, 2-hexen-4-ol and the like.

The manner in which the compounds of the present invention can be prepared readily is illustrated in the following examples.

EXAMPLE 1

Preparation of bis[(1,4,5,6,7,7-hexachloro-5-norbornen-2-yl)-methyl]fumarate 1,4,5,6,7,7 - hexachloro-2-hydroxymethyl-5-norbornene (222 grams; 0.66 mol), fumaric acid (38.7 grams; 0.33 mol), para-toluenesulfonic acid (3.8 grams), and toluene (150 ml.) were charged into a 500 ml. glass reaction flask equipped with a mechanical stirrer, thermometer, Dean-Stark tube and reflux condenser. The reaction mixture was then heated at reflux for a period of about 20 hours. After this time the reaction mixture was cooled and passed through a bed of diatomaceous earth. The resulting solution was stripped of toluene and the residue was dissolved in ether. The etheral solution was treated with activated charcoal and was then washed with an aqueous solution of sodium bicarbonate. The washed solution was then dried and stripped of ether, and the resulting viscous yellow product was passed through a falling film still at a temperature of about 160° C. and at 1 to 2 mm. of mercury pressure to yield bis[(1,4,5,6,7,7-hexachloro-5-norbornen-2-yl)-methyl]fumarate having the following elemental analysis as calculated for $C_{20}H_{12}Cl_{12}O_4$. Theoretical (percent): C, 32.28; H, 1.63; Cl, 57.36. Found (percent): C, 32.29; H, 1.71; Cl, 56.87.

EXAMPLE 2

Preparation of bis[(1,4,5,6,7,7-hexachloro-5-norbornen-2-yl)-methyl]maleate 1,4,5,6,7,7 - hexachloro-2-hydroxymethyl-5-norbornene (222 grams; 0.66 mol), maleic anhydride (32.7 grams; 0.33 mol), para-toluenesulfonic acid (3.8 grams), and toluene (150 ml.) are charged into a glass reaction flask equipped with stirrer, thermometer, Dean-Stark tube and reflux condenser.The reaction mixture was then heated at reflux for a period of several hours and 6.5 ml. of water was azeotroped. After this time the toluene was stripped off and methylene chloride was added. The methylene chloride solution was washed, first with water and then with aqueous sodium carbonate, dried over anhydrous sodium sulfate, and filtered. The resulting solution was evaporated to yield a viscous oil. Additional maleic anhydride (5 grams), para-toluenesulfonic acid and toluene (150 ml.) was added to the oil and the mixture refluxed again for several hours. The mixture was then stripped of toluene, redissolved in methylene chloride and washed with water and aqueous sodium bicarbonate. The solution was then passed through diatomaceous earth washed again with water, and was dried and stripped of methylene chloride to yield bis[(1,4,5,6,7,7-hexachloro-5-norbornen-2-yl)-methyl]maleate having the following elemental analysis as calculated for $C_{20}H_{12}Cl_{12}O_4$. Theoretical (percent): C, 32.38; H, 1.63; Cl, 57.36. Found (percent): C, 32.43; H, 1.67; Cl, 57.05.

EXAMPLE 3

Preparation of bis [(1,4,5,6,7,7-hexachloro-3-methyl-5-norbornen-2-yl)-methyl]fumarate 1,4,5,6,7,7-hexachloro - 2 - hydroxymethyl-3-methyl-5-norbornene (345 grams; 1.0 mol), fumaric acid (58 grams; 0.5 mol), para-toluene sulfonic acid (6 grams), and toluene (250 ml.) are charged into a glass reaction flask equipped with mechanical stirrer, thermometer and a Dean-Stark tube and reflux condenser. The reaction mixture is then heated at reflux for a period of about 25 hours. After this time the reaction mixture is cooled and passed through a bed of Fuller's earth. The resulting solution is stripped of toluene and the residue is dissolved in ether. The etheral solution is treated with activated charcoal and is then washed with aqueous sodium bicarbonate. The washed solution is dried over anhydrous magnesium sulfate and is then stripped of ether to yield bis[(1,4,5,6,7,7-hexachloro-3-methyl - 5 - norbornen-2-yl)-methyl]fumarate.

EXAMPLE 4

Preparation of 1,4,5,6,7,7-hexabromo-2-($\beta$-hydroxyethyl)-3,3-dimethyl-5-norbornene Hexabromocyclopentadiene (540 grams; 1.0 mol) and 4-methyl-3-penten-1-ol (100 grams; 10 mol), are charged into a glass reaction vessel equipped with a mechanical stirrer and thermometer. The reaction mixture is then heated at about 140° C. for a period of 4 days. After this time the reaction mixture is cooled and is dissolved in ether. The etheral solution is treated with activated charcoal, filtered and then stripped of solvent resulting in a solid product. The solid is recrystallized to yield 1,4,5,6,7,7-hexabromo - 2 - ($\beta$-hydroxyethyl)-3,3-dimethyl-5-norbornene.

EXAMPLE 5

Preparation of bis[$\beta$-(1,4,5,6,7,7-hexabromo-3,3-dimethyl-5-norbornen-2-yl)-ethyl]fumarate 1,4,5,6,7,7-hexabromo - 2 - ($\beta$-hydroxyethyl)-3,3-dimethyl-5-norbornene (308 grams; 0.5 mol), fumaric acid (29 grams; 0.25 mol), para-toluene sulfonic acid (3 grams) and toluene (150 ml.) are charged into a glass reaction flask equipped with mechanical stirrer, thermometer and a Dean-Stark tube and reflux condenser. The reaction mixture is then heated at reflux for a period of about 30 hours. After this time the reaction mixture is cooled and passed through a bed of fuller's earth. The resulting solution is stripped of toluene and the residue is dissolved in ether. The etheral solution is treated with activated charcoal, washed with water, and is then stripped of ether to yield bis[$\beta$-(1,4,5,6,7,7 - hexabromo-3,3-dimethyl-5-norbornen-2-yl)-ethyl]fumarate.

Other compounds within the scope of this invention can be prepared by the procedures described in the foregoing examples. Presented in the following examples are the essential ingredients required to prepare the indicated named compounds according to the procedures heretofore described.

EXAMPLE 6

1,4,5,6,7,7 - hexachloro - 2 - ($\beta$-hydroxyethyl-5-norbornene+maleic acid=bis[$\beta$-(1,4,5,6,7,7 - hexachloro-5-norbornen-2-yl)-ethyl]maleate.

EXAMPLE 7

1,4,5,6,7,7 - hexachloro - 2 - ($\beta$-hydroxyethyl-5-norbornene+fumaric acid=bis[$\beta$ - (1,4,5,6,7,7-hexachloro-5-norbornen-2-yl)-ethyl]fumarate.

EXAMPLE 8

1,4,5,6,7,7 - hexachloro - 2 - hydroxymethyl-3-methyl-5-norbornene+maleic anhydride=bis[(1,4,5,6,7,7-hexachloro-3-methyl-5-norbornen-2-yl)-methyl]maleate.

EXAMPLE 9

Hexabromocyclopentadiene+5 - hexen-1-ol+fumaric acid=bis[δ-(1,4,5,6,7,7 - hexabromo - 5 - norbornen-2-yl)-n-butyl]fumarate.

EXAMPLE 10

Hexachlorocyclopentadiene+2 - methyl - 2 - penten-1-ol+fumaric acid=bis[(1,4,5,6,7,7 - hexachloro - 2 -methyl-3-ethyl-5-norbornen-2-yl)-methyl]fumarate.

EXAMPLE 11

1,2,3,4 - tetrachloro - 5,5 - dimethoxycyclopentadiene +allyl alcohol+fumaric acid=bis[(1,4,5,6-tetrachloro-7,7-dimethoxy-5-norbornene-2-yl)-methyl]fumarate.

The compounds of the present invention are useful as plasticizers for synthetic resin compositions. The utility of the compounds of the present invention as plasticizers was demonstrated in an experiment carried out for the plasticization of nitrocellulose. Nitrocellulose is widely used in the protective coating industry for the preparation of high quality lacquers. Nitrocellulose by itself, however, does not form continuous films and must therefore be plasticized. The following example illustrates the effectiveness of the compounds of the present invention as plasticizers for nitrocellulose.

EXAMPLE 12

Use of the compounds of the present invention as a plasticizer

A 50% by weight solution of a ½ second nitrocellulose resin in an ethanol/isopropanol mixture was prepared and about 10% by weight, based on the nitrocellulose, of bis[(1,4,5,6,7,7 - hexochloro - 5 - norbornen-2-yl)-methyl]fumarate was added thereto. The resulting plasticized nitrocellulose solution was then cast, as a 3 mil wet film, on a glass panel. After the evaporation of the solvent a continuous film resulted. The plasticized film thus obtained also possesses flame retardant properties due to the compounds of this invention.

The compounds of the present invention will react with vinylic monomers to form a variety of valuable polymeric compositions Such compositions are useful for casting or molding plastic articles which will exhibit fire retardant properties.

Exemplary of the monomers which can be polymerized with the compounds of this invention are acrylic acid, methacrylic acid, styrene, vinyl toluene, α-methyl styrene, methyl acrylate, methyl methacrylate, ethyl acrylate, acrylonitrile, vinyl acetate, vinyl benzoate and the like. In general, it is preferred that the monomers used contain a single vinyl group in a terminal position.

The polymerization of the compounds of the present invention with monomeric vinyl compounds is preferably carried out in the presence of free radical catalysts, such as the conventional peroxide or azo-type initiators, at a temperature suitable for the particular catalyst used. Exemplary of such catalysts are benzoyl peroxide, acetyl peroxide, di-t-butyl peroxide, azobisisobutyronitrile, 2,2'-azobis-2-methylbutyronitrile and the like.

The following examples are presented to illustrate the preparation of polymeric compositions with the compound of the present invention.

EXAMPLE 13

Preparation of a copolymer of bis[(1,4,5,6,7,7-hexachloro-5-norbornen-2-yl)-methyl]fumarate and styrene Bis[(1,4,5,6,7,7-hexachloro-5-norbornen-2-yl) - methyl] fumarate (34.5 grams; 0.1 mol), styrene (11.5 grams; 0.6 mol) and benzoyl peroxide (0.46 gram) are charged into a glass reaction vessel. The mixture is stirred and the reaction vessel is placed into an oil bath and heated at a temperature of about 70° C. for a period of about 1 hour. After this time the temperature of the reaction mixture is raised to 100° C. and held for two hours. The product is then cooled and recovered to yield a solid cast.

EXAMPLE 14

Preparation of a copolymer of bis[(1,4,5,6,7,7-hexachloro-5-norbornen-2-yl)-methyl]maleate, styrene and methyl methacrylate A mixture of bis[(1,4,5,6,7,7-hexachloro-5-norbornen-2-yl)-methyl]maleate (7.42 grams), styrene (3.12 grams) methyl methacrylate (2.00 grams) and benzoyl peroxide (0.13 gram) was charged into a glass tube and placed in a 70° C. oil bath. When the mixture hardened the oil bath temperature was slowly raised to 120° C. The tube was then removed from the bath and was cooled resulting in a solid cast weighing 10.90 grams.

EXAMPLE 15

Preparation of a copolymer of bis[β-(1,4,5,6,7,7-hexachloro-5-norbornen-2-yl)-ethyl]maleate and vinyl benzoate Bis[β - (1,4,5,6,7,7-hexachloro-5-norbornen-2-yl)ethyl] maleate (7.2 grams), vinyl benzoate (3.0 grams) and benzoyl peroxide (0.1 gram) is charged into a glass tube and placed into a 75° C. oil bath. When the mixture has hardened the oil bath temperature is raised to 130° C. for a period of about 1 hour. The glass tube is then removed from the bath and cooled to yield a solid cast.

The products of Examples 13 to 15 can be used for numerous applications wherein strong, fire retardant castings or molded articles are required. Thus, for example, when the polymeric composition heretofore described is cast into large sheets they can be used as structural members.

I claim:
1. A compound of the formula

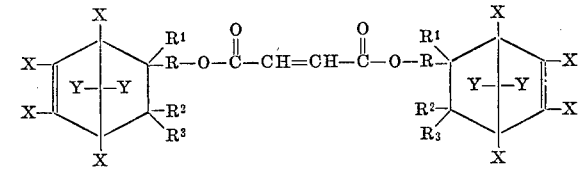

wherein X is selected from the group consisting of chlorine, bromine and fluorine; Y is selected from the group consisting of hydrogen, chlorine, bromine, and fluorine; R is an alkylene group containing from one to six carbon atoms; $R^1$, $R^2$, and $R^3$ are selected from the group consisting of hydrogen and alkyl containing from one to four carbon atoms.

2. The compound of claim 1, bis[(1,4,5,6,7,7-hexachloro-5-norbornen-2yl)-methyl]fumarate.

3. The compound of claim 1, bis[(1,4,5,6,7,7-hexachloro-5-norbornen-2-yl)-methyl]maleate.

4. The compound of claim 1, bis[(1,4,5,6,7,7-hexachloro-3-methyl-5-norbornen-2-yl)-methyl]fumarate.

5. The compound of claim 1, bis[β-(1,4,5,6,7,7-hexachloro-5-norbornen-2-yl)-ethyl]fumarate.

6. The compound of claim 1, bis[(1,4,5,6,7,7-hexabromo-5-norbornen-2-yl)-methyl]fumarate.

References Cited

UNITED STATES PATENTS 2,841,484  7/1958  Johnson _____ 260—476
3,489,792  1/1970  Greenbaum et al. ____ 260—485

LORRAINE A. WEINBERGER, Primary Examiner

E. J. SKELLY, Assistant Examiner

U.S. Cl. X.R.

260—31.8, 78.5